United States Patent [19]
Da Re'

[11] Patent Number: 5,652,375
[45] Date of Patent: Jul. 29, 1997

[54] APPARATUS, METHOD AND REUSABLE MODEL-STRUCTURE FOR IMPACT TESTING VEHICLE COMPONENTS

[75] Inventor: Mario Da Re', Torino, Italy

[73] Assignee: Fiat Auto S.p.A., Italy

[21] Appl. No.: 557,164

[22] PCT Filed: Jun. 21, 1994

[86] PCT No.: PCT/IT94/00091

§ 371 Date: Dec. 20, 1995

§ 102(e) Date: Dec. 20, 1995

[87] PCT Pub. No.: WO95/00828

PCT Pub. Date: Jan. 5, 1995

[30] Foreign Application Priority Data

Jun. 22, 1993 [IT] Italy .................. TO93A0451

[51] Int. Cl.$^6$ .................. G01M 7/00; G01N 3/08; G01N 3/30
[52] U.S. Cl. .................. 73/12.04; 73/12.01; 73/12.07
[58] Field of Search .................. 73/12.01, 12.04, 73/12.07, 12.08, 12.09, 12.14

[56] References Cited

U.S. PATENT DOCUMENTS 3,757,562  9/1973  Goldberg et al. .................. 73/12.04
4,524,603  6/1985  Hargunani et al. .................. 73/12.01
4,545,236  10/1985  Turczyn .................. 73/12.04
5,325,700  7/1994  Litten .................. 73/11.06
5,483,845  1/1996  Stein et al. .................. 73/12.01

FOREIGN PATENT DOCUMENTS 0 474 432 A2  8/1991  European Pat. Off. .
43 30 122 A1  3/1994  Germany .

*Primary Examiner*—Richard Chilcot
*Assistant Examiner*—Max H. Noori
*Attorney, Agent, or Firm*—Shlesinger Arkwright & Garvey

[57] ABSTRACT

The front body assembly of a vehicle is simulated by a reusable model-structure (6) featuring a pair of side members (8, 9) collapsible accordion fashion and each comprising a number of arms (16, 18) hinged in series with one another by respective articulating means (19, 20), and a number of hydraulic friction joints (20) constituting at least some of the articulating means. Each hydraulic joint (20) presents an adjustable sliding torque by virtue of being connected to pressurized fluid supply means (43) via a respective pressure regulating valve (42). Once calibrated, the model-structure (6), which thus presents the same collapse performance as the front body assembly being simulated, is fitted with the test component (2) and used for impact testing; and, following impact, the collapsed model-structure (6) is restored to its original configuration by means of hydraulic actuators (38), after first zeroing the pressure of the hydraulic joints (20).

9 Claims, 5 Drawing Sheets

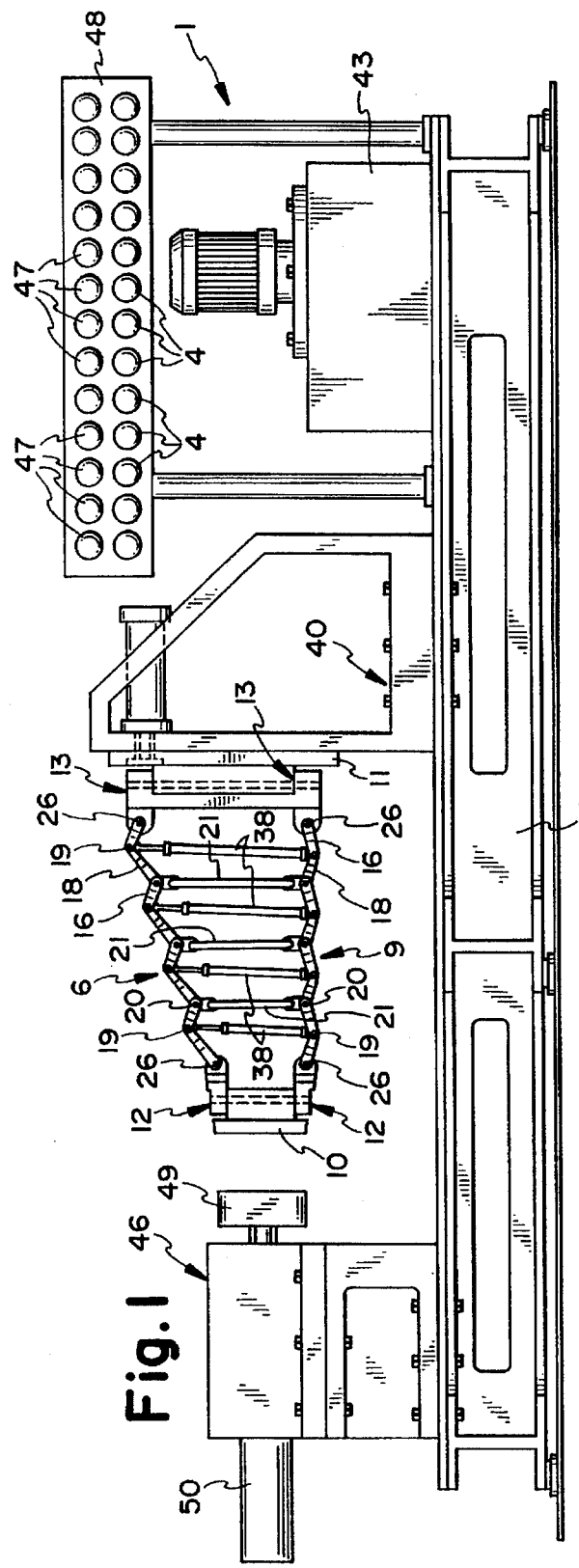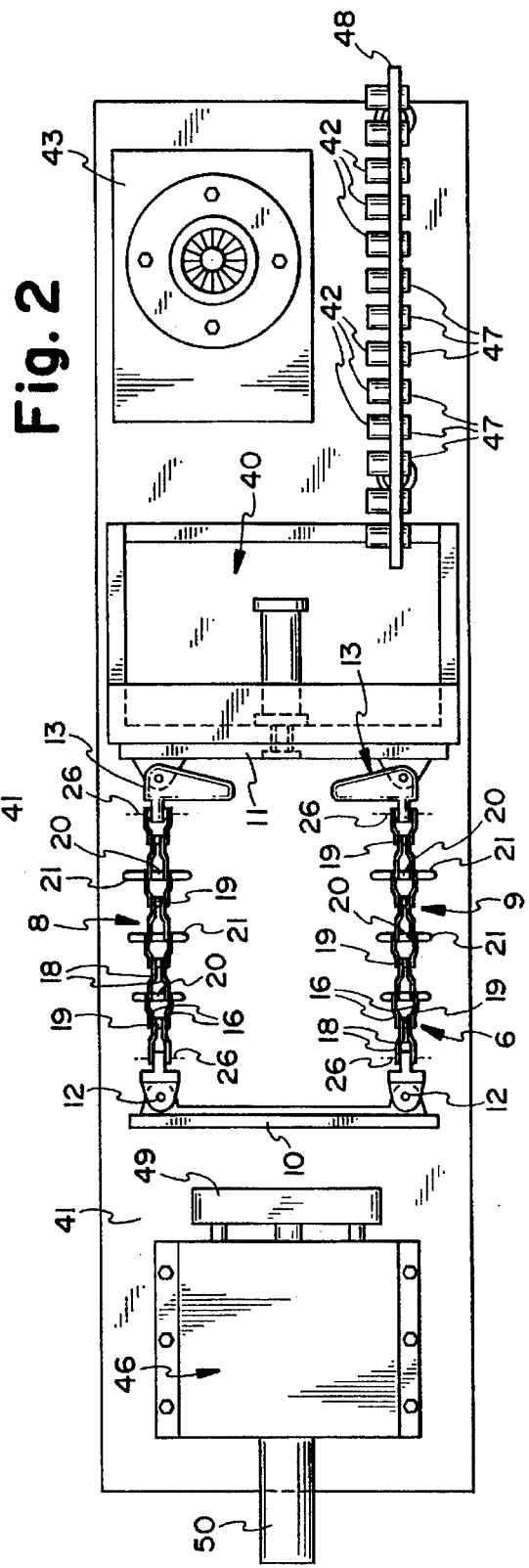

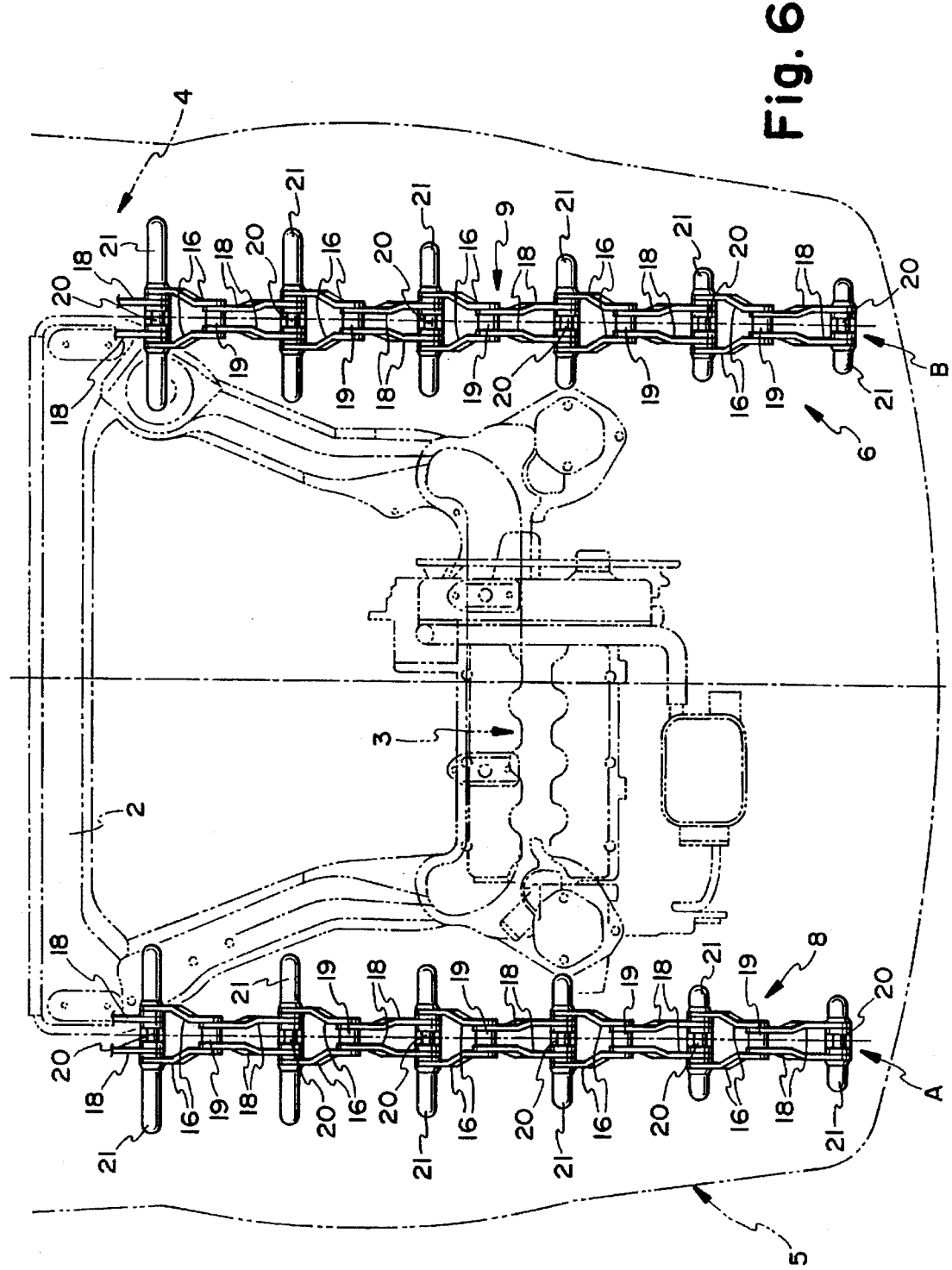

APPARATUS, METHOD AND REUSABLE MODEL-STRUCTURE FOR IMPACT TESTING VEHICLE COMPONENTS

TECHNICAL FIELD

The present invention relates to an apparatus for impact testing the mechanical performance of vehicle components, in particular the front load-bearing components of a vehicle body or structure, such as the front cross member, engine supporting frame and similar, but without involving total destruction of the vehicle.

The present invention also relates to a test method employing the above apparatus, and to a reusable, collapsible model-structure forming the main part of the apparatus, designed to receive the test component, and which, with the component on board, provides for standard impact testing by accurately simulating the dynamic performance of any existing front vehicle body assembly.

BACKGROUND ART

Before launching a new model on to the market, or whenever improvements or changes are made to the load-bearing components of existing models, all car manufacturers conduct "live" impact tests to determine the mechanical response of vehicle body and internal passenger compartment components to dynamic design stress. At present, these tests involve a good deal of expense in that simply determining the response of one component (e.g. the engine supporting frame, front cross member, bumper, seat guide, safety belt fasteners, etc.) involves the total destruction of vehicles identical to those for marketing. For, even though the deformation performance of the overall vehicle structure may be determined easily and cheaply by means of full-vehicle impact tests conducted for other purposes (e.g. passenger safety tests using a manikin), this is not sufficient for extrapolating the performance of individual components.

DISCLOSURE OF INVENTION

It is an object of the present invention to provide an apparatus for "live" impact testing vehicle components, particularly single front vehicle body components, without requiring total destruction of the vehicle.

In particular, it is an object of the present invention to provide a mechanical "model" structure for simulating, without damage, the impact performance of any front vehicle assembly, so as it may be reused in numerous tests, in order to be used in conjunction with the above apparatus for determining the resistance of vehicle body and internal passenger compartment components, providing for drastically reducing the cost of current test methods.

Finally, it is a further object of the present invention to provide a test method employing the above apparatus and wherein the above model-structure is used in lieu of the complete vehicle.

According to the present invention, there is provided an apparatus for impact testing vehicle components, characterized by the fact that it comprises a reusable trestle type model-structure designed, on impact, to switch from an extended to a collapsed configuration with the same dynamic performance as the front vehicle body assembly being simulated, the model-structure comprising a number of substantially rigid, load-bearing elements articulated by means of friction elements with an adjustable sliding torque; the apparatus also comprising means for supporting the model-structure; means for selectively calibrating the sliding torque of each friction element to a predetermined value above which the friction element permits relative rotation of the load-bearing elements connected by it, and hence collapse of the model-structure; and at least one actuator for restoring the model-structure, after impact, from the collapsed configuration to the same extended configuration prior to impact; the model-structure being designed, at least in the extended configuration, to receive at least one vehicle test component.

As opposed to using, and hence destroying, a high-cost production vehicle, the test apparatus according to the present invention thus provides for employing a low-cost model-structure which is in no way damaged during testing and may thus be reused for any number of tests.

The above apparatus is employed in a vehicle component impact test method, characterized by the fact that it comprises the following stages:

setting up a reusable model-structure for simulating the dynamic collapse performance of the vehicle of which the test component forms part; the model-structure being formed by connecting a number of substantially rigid, load-bearing elements in articulated manner by means of friction elements with an adjustable sliding torque;

so calibrating said model-structure as to enable it, upon impact, to switch from an extended to a collapsed configuration with the same dynamic performance as the front vehicle body assembly being simulated; said calibrating stage being performed by trial and error, by subjecting the model-structure to a predetermined amount of dynamic stress, determining the dynamic collapse performance of the structure, restoring the structure to the extended configuration, and separately adjusting the sliding torque of each friction element until the dynamic collapse performance of the model-structure corresponds with the known performance of the body assembly being simulated;

fitting the test component to the extended model-structure, and conducting a normal impact test using the model-structure in lieu of the vehicle to which the test component is to be mounted.

The known deformation performance of each vehicle as a whole is thus used for accordingly calibrating a single model-structure which, once calibrated, provides for accurately simulating the deformation performance of the front assembly of a given vehicle model. As such, one model-structure and one test apparatus according to the present invention provide for all-round testing of substantially any existing vehicle model.

In particular, a reusable model-structure is employed, characterized by the fact that it comprises a first and second trestle type side member collapsible accordion fashion, located parallel/to each other, and each comprising a number of arms hinged in series with one another by respective articulating means, and a number of hydraulic friction joints constituting at least some of the articulating means.

BRIEF DESCRIPTION OF THE DRAWINGS

A non-limiting embodiment of the present invention will be described by way of example with reference to the accompanying drawings, in which:

FIGS. 1 and 2 respectively show an elevation and top plan view of a test apparatus in accordance with the present invention;

FIGS. 5 and 6 respectively show an elevation and top plan view of the FIG. 3 and 4 model-structure in use.

BEST MODE FOR CARRYING OUT THE INVENTION

Figure 3:
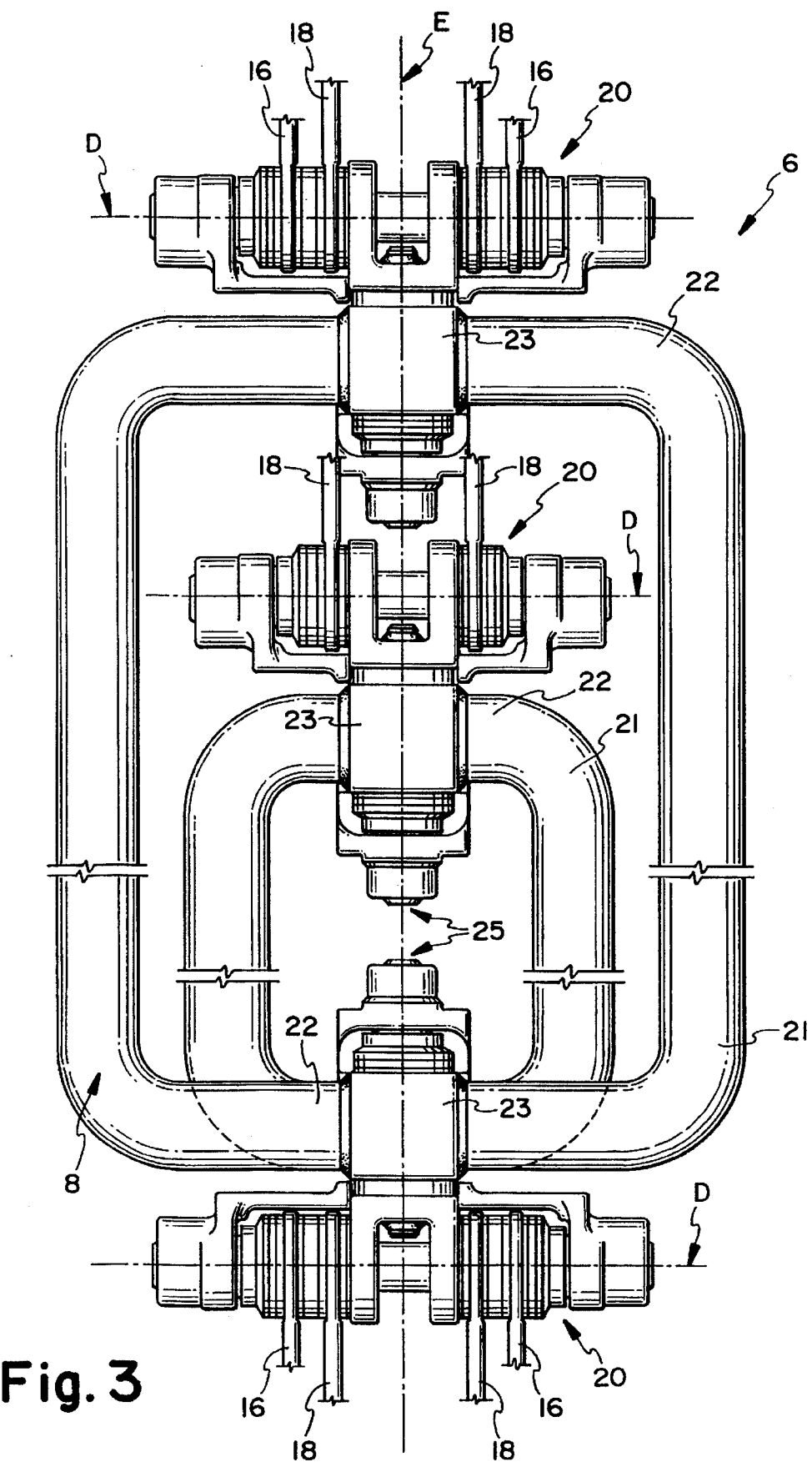
FIGS. 3 and 4 respectively show an enlarged rear view of the front, and an enlarged, partially sectioned detail, of a model-structure employed on the FIG. 1 and 2 apparatus.

With reference to FIGS. 1, 2 and 5, 6, number 1 indicates an apparatus for destructive impact testing vehicle components—in the non-limiting example shown, the front frame 2 supporting the engine 3 of a vehicle 4 (FIGS. 5, 6) of which the dynamic deformation performance of at least the front body assembly 5 is known.

According to the main characteristic of the present invention, apparatus 1 comprises a twin-trestle type model-structure 6, designed to receive test component 2 and to simulate, during normal impact testing, the known dynamic collapse performance of front body assembly 5 of vehicle 4. As such, known impact testing for determining the on-vehicle mechanical performance of component 2, and consisting in driving vehicle 4 as a whole, complete with component 2, at a given speed against a fixed obstacle, may be performed using, in lieu of vehicle 4, model-structure 6 which provides in every way for mechanically simulating front body assembly 5.

According to the present invention, model-structure 6 is formed, on the one hand, so as to undergo no damage during impact testing, thus enabling it to be reused, as will be seen, for any number of tests; and, on the other hand, so as to selectively simulate the performance of the front body assembly of vehicles 4 of different types and models, by simply "setting up" or calibrating model-structure 6 on apparatus 1 prior to testing.

Figure 4:
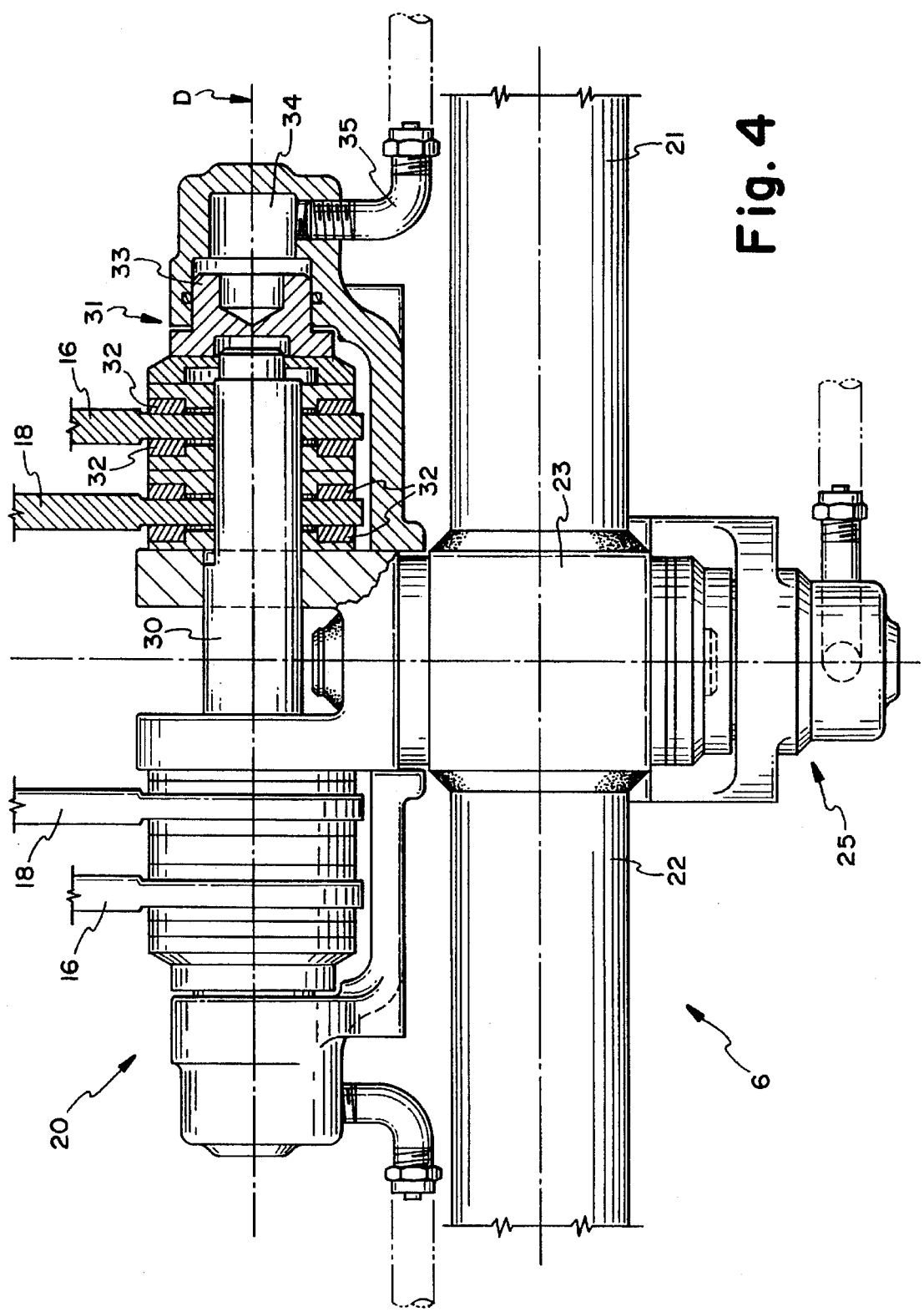
Figure 5:
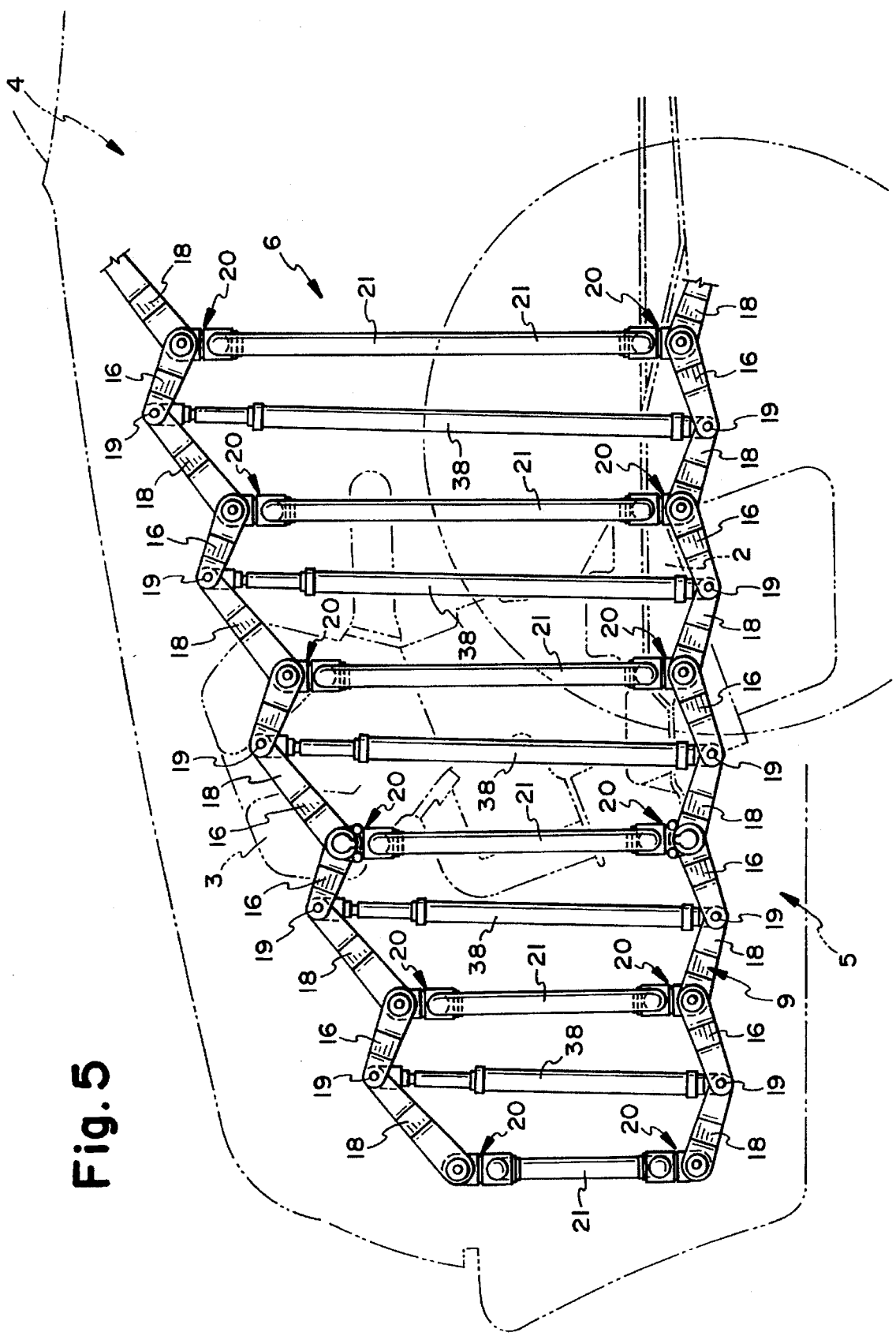

With reference also to FIGS. 3 and 4, model-structure or mechanical simulator 6 according to the present invention comprises two side members 8, 9 in the form of three-dimensional trestle structures collapsible lengthwise in accordion fashion (i.e. in the direction of respective axes A and B—FIG. 6); and two rigid, respectively front and rear cross members 10, 11 defined by load-bearing base elements in the form of a plate. Cross members 10, 11 are useful for achieving unity of model-structure 6 even when detached from apparatus 1, and for protecting side members 8, 9 during impact, but are not strictly indispensable as regards operation of structure 6.

More specifically, side members 8, 9 and cross members 10, 11 are arranged parallel to each other so that, viewed from above, structure 6 presents the form of a quadrilateral; and are connected to one another at the corners of quadrilateral structure 6 by hinge type articulating means defined, for cross member 10, by a pair of idle vertical-axis pins 12, and, for cross member 11, by a pair of known hydraulic friction joints 13 with a rotation axis parallel to that of pins 12, so that, viewed from above, model-structure 6 defines an articulated quadrilateral.

Each identical side member 8, 9 comprises a number of substantially rigid, load-bearing elements defined by pairs of parallel arms 16, 18 hinged in series and in zig-zag fashion to one another by respective articulating means, the axes of rotation of which are all parallel to one another, and perpendicular to axes A, B and to the rotation axes of pins 12 and friction joints 13. According to the present invention, said articulating means consist alternately of respective idle pins 19, and a number of hydraulic friction joints 20 of the same type as joints 13 but a different model.

To support joints 20 and ensure the structural solidity of side members 8, 9, these also comprise a number of rigid rectangular frames 21, e.g. made of bent, welded tubular metal elements, increasing in size from cross member 10 towards cross member 11 (FIGS. 3 and 6), and the respective top and bottom horizontal portions 22 of which are fitted integral with hydraulic friction joints 20, e.g. by means of brackets 23 either welded or locked by further joints 25, so that, on either side of each frame 21, two pairs of arms 18 (one from bottom horizontal portion 22, and one from top portion 22) extend towards cross member 11, and two pairs of arms 16 towards cross member 10. Further end pairs of arms 16 and 18 provide for connecting side members 8, 9 in articulated manner to cross members 10, 11 by means of pins 26 parallel to pins 19, and via pins 12 and friction joints 13 described previously.

As shown particularly in FIG. 4, known hydraulic friction joints 20—e.g. of the type known as SAFESET marketed by MONDIAL of Milan—present an adjustable sliding torque below which any relative movement of connected arms 16, 18 is prevented, and above which arms 16 are permitted to rotate, with a predetermined amount of friction, in relation to arms 18 and about mutual hinge axes D (FIGS. 3 and 4) parallel to the axes of pins 19.

In the example shown, each joint 20 comprises a pin 30 housed idly inside a fluidtight housing 31 integral with respective frame 21. Arms 16, 18 are fitted angularly integral with pin 30, and cooperate laterally, on either side, with respective friction disks 32 fitted inside and integral with housing 31 and therefore angularly fixed but axially slidable in relation to pin 30. Friction disks 32 and arms 16, 18 are acted on by a piston 33 activated by the hydraulic pressure inside a chamber 34 formed inside housing 31 and connected by a pipe 35 to a pressurized fluid, e.g. oil, source. Friction disks 32 thus exert on arms 16, 18 a retaining torque proportional to the hydraulic pressure inside chamber 34 and, hence, to the axial pressure exerted by piston 33; and said sliding torque of the joint is that which, applied to pins 30 by arms 16, 18, exceeds the retaining torque exerted by friction disks 32 by just enough to slide friction disks 32 and hence rotate arms 16, 18 in relation to housing 31.

Structure 6 therefore behaves as a statically determined structure as long as the stress applied to it (e.g. by cross member 10) is such that the torques transmitted to arms 16, 18 are below the sliding torque of each joint; whereas it becomes a reticulated structure with at least a few weak nodes when said stress is such that the torque transmitted to even only one arm 16 or 18 is greater than the retaining torque exerted by friction disks 32, i.e. greater than the sliding torque of the respective joint 20. As the latter torque is proportional to the hydraulic pressure in respective chamber 34, by appropriately regulating this pressure differently from one joint to another, it is possible to achieve different responses of the same structure 6 to the same system of external mechanical stress applied to it.

The same also applies to joints 13 (not shown in detail) only in this case relative to axes perpendicular to axes D and parallel to pins 12. Consequently, when a side member 8, 9 as a whole transmits to respective joint 13 a torque greater than the sliding torque of the joint, the quadrilateral defined by side members 8, 9 and cross members 10, 11 becomes statically weak, thus enabling rotation about the axes of pins 12 and joints 13. As such, model-structure 6 may selectively assume two configurations: an extended configuration (FIGS. 1, 2 and 5, 6) wherein arms 16, 18 are arranged at an angle to each other, the size of structure 6 as a whole is comparable with that of the front body assembly being simulated (FIGS. 5, 6), and structure 6 may be fitted with at least one vehicle test component (in this case, frame 2); and a collapsed configuration (not shown) wherein structure 6 is compressed accordion fashion along axes A, B, and possibly also positioned obliquely in relation to axes A, B by virtue of also rotating about joints 13 and pins 12.

For restoring it from the collapsed to the extended position, structure 6 as shown comprises a number of hydraulic actuators 38 mounted, in the example shown, between each top and bottom/pair of arms 16, 18 of each joint 20, at connecting pins 19, and which, when withdrawn/extended, provide for moving in relation to each other the arms 16, 18 connected to the opposite ends of each actuator.

It should be stressed that model-structure 6 as described above is purely indicative, and may differ widely in design with no effect on performance. For example, according to variations not shown, actuators 38 may be replaced by a single actuator connected to the opposite ends of cross members 10 and 11, or by one or more actuators forming part of apparatus 1; four-armed friction joints 20 may be replaced by twice as many hydraulic friction joints, each having one arm 16 and one arm 18 arranged side by side in pairs on each portion 22 of frame 21; for achieving even greater articulation of structure 6, joints 25 of brackets 23 may also be in the form of hydraulic friction joints (FIG. 4) similar to joints 20, thus enabling pairs of arms 16, 18 in each set to rotate about an axis E (FIG. 3) perpendicular to respective rotation axis D of respective joint 20.

For better exploiting model-structure 6, apparatus 1 also comprises means for supporting structure 6 and defined, in the example shown, by a frame type slide 40 (FIGS. 1 and 2) mounted in fixed manner (or permitted to slide by releasing appropriate lock means) on a supporting bed 41; means for selectively calibrating the sliding torque of each friction disk 32 of joints 20 and 13; and, if not provided on model-structure 6, at least one actuator for restoring structure 6, after impact, from the collapsed configuration to the same extended configuration prior to impact.

In particular, said calibrating means comprise respective known valves 42 for regulating the hydraulic supply pressure of each hydraulic friction joint 13, 20 between a minimum zero value and a maximum value equal, for example, to the head of a pump 43 supplying pressurized oil for activating friction joints 13, 20; means, consisting for example of known coiled tubes (not shown), for supplying said pressurized oil produced by pump 43 to hydraulic friction joints 13, 20 via valves 42, and so enabling hydraulic connection while at the same time permitting relative movement of the various components of structure 6; a thrust device 46 for "hammering", and so exerting predetermined dynamic stress on, structure 6; and means for displaying a quantity proportional to the sliding torque of each joint 13, 20—in the example shown, a set of gauges 47 showing the supply pressure of each friction joint 13, 20, and mounted together with valves 42 on a console 48 fixed to bed 41.

In the example shown, device 46 is fitted integral with bed 41 (possibly in removable manner), and consists of a hammer or ram 49 powered by a known, e.g. hydraulic, actuating device 50 by which model-structure 6, fixed to bed 41 by supporting slide 40, is subjected via hammer or ram 49 to dynamic stress similar to that produced by impact of structure 6 at a predetermined speed against a fixed obstacle.

According to the present invention, apparatus 1 and structure 6 are employed in a method for destructive impact testing vehicle components such as frame 2 by simulating real on-vehicle impact conditions of the test component. The first stage in the method consists in fixing reusable model-structure 6 in the extended position to bed 41, after which joints 13, 20 of structure 6 are calibrated using device 46, also fixed to bed 41, as shown in FIGS. 1 and 2. More specifically, the calibrating stage consists in so setting valves 42 as to supply friction joints 13, 20 with oil at predetermined pressures as required; structure 6 is then subjected, by hammer or ram 49 striking cross member 10, to sufficient impact to collapse it, while at the same time determining, using known, e.g. optical and/or electromechanical means (not shown), the dynamic collapse performance of structure 6 as a result of impact; and, finally, structure 6 is restored to the original extended configuration by adjusting friction disks 32 so that each presents a sliding torque of zero (i.e. the supply pressure of joints 13, 20 is zeroed by fully closing valves 42 or a main valve for cutting off supply by pump 43) and by immediately operating actuators 38.

At this point, the above operations are repeated in trial-and-error fashion, each time adjusting the supply pressure of each joint 13, 20 by means of respective valve 42, until the passage of structure 6 from the extended to the collapsed configuration as a result of the blow inflicted by hammer 49 is identical to the known performance of front body assembly 5 being simulated. When this is achieved, structure 6 is ready for use, after first assembling the test component.

The actual impact test may be performed on apparatus 1 using hammer 49, or in conventional manner by driving structure 6 against a fixed obstacle. For example, structure 6, still connected by extendible hoses to valves 42 and pump 43 for pressurizing joints 13, 20, is removed from fixed slide 40 and mounted on an identical slide (not shown) movable along bed 41 or a similar bed of a conventional test station to the side of apparatus 1; the slide with structure 6 fitted with the test component is driven at predetermined speed against a known fixed stop (not shown) so as to collapse structure 6; the test component is recovered and examined; and, according to the present invention, structure 6 is restored to the original extended configuration (by zeroing the supply pressure of joints 13, 20 and operating actuators 38) ready for testing another similar or different component.

According to one characteristic of the above test method, joints 13, 20 are so designed that the maximum sliding torque of friction disks 32 is always less than the minimum value which, during impact testing or even the calibrating stage, would stress the load-bearing elements 10, 11, 16, 18, 21 of structure 6 over and above their yield point, thus preventing any possibility of damage to model-structure 6 during impact testing, and so enabling it to be reused any number of times. Moreover, by simply repeating the calibrating stage, the same model-structure 6 may be used for simulating the performance of different vehicle body structures 5, thus further enhancing the versatility and reducing the cost of the method according to the present invention.

I claim:

1. An apparatus (1) for impact testing vehicle components (2), characterized by the fact that it comprises a reusable trestle type model-structure (6) designed, on impact, to switch from an extended to a collapsed configuration thereby simulating the dynamic performance of a front vehicle body assembly to be tested, said model-structure (6) comprising a number of substantially rigid, load-bearing elements (16, 18) articulated by means of friction elements (20) with an adjustable sliding torque; said apparatus (1) also comprising means (40) for supporting said model-structure (6); means (42) for selectively calibrating the sliding torque of each of said friction elements. (20) to a predetermined value above which said friction elements permits relative rotation of said load-bearing elements (16, 18) connected by it, and hence collapse of said model-structure (6); and at least one actuator (38) for restoring said model-structure (6), after impact, from the collapsed configuration to the same extended configuration prior to that of impact; said model-structure (6) being designed, at least in the extended configuration, to receive at least one of said vehicle test components (2).

2. An apparatus (1) as claimed in claim 1, characterized by the fact that said friction elements are hydraulic friction elements (20); and by the fact that said calibrating means comprise respective valves (42) for regulating a hydraulic supply pressure operatively associated with each of said hydraulic friction elements (20) of said model-structure between a minimum zero value and a maximum value; and means (43) for supplying said hydraulic friction elements (20) with pressurized fluid via said valves.

3. An apparatus (1) as claimed in claim 1 characterized by the fact that said calibrating means comprise a thrust device (46) for subjecting said model-structure (6), fixed to said supporting means (40), to predetermined dynamic stress of the type resulting from impact; and means (47) for displaying a quantity proportional to the sliding torque of each said friction element (20).

4. A method of impact testing vehicle components (2), characterized by the fact that it comprises the following stages:

a) setting up a reusable model-structure (6) for simulating the dynamic collapse performance of the vehicle of which the test component forms part; the model-structure (6) being formed by connecting a number of substantially rigid, load-bearing elements (10, 11; 16, 18) in articulated manner by means of friction elements (13, 20) with an adjustable sliding torque;

b) so calibrating said model-structure (6) as to enable it, upon impact, to switch from an extended to a collapsed configuration thereby simulating the dynamic performance of a front vehicle body assembly to be tested; said calibrating stage being performed by trial and error, by subjecting said model-structure (6) to a predetermined amount of dynamic stress, determining the dynamic collapse performance of said structure (6), restoring said structure to the extended configuration, and separately adjusting the sliding torque of each friction element (13, 20) until the dynamic collapse performance of said model-structure corresponds with a known pre-determined performance of the body assembly being simulated;

c) fitting said test component (2) to said extended model-structure (6), and conducting a normal impact test using said model-structure in lieu of a vehicle to which said test component (2) is to be mounted.

5. A method as claimed in claim 4, characterized by the fact that, following impact testing, said model-structure (6) is restored to the extended configuration for further testing.

6. A method as claimed in claim 5, characterized by the fact that the extended configuration is restored by so adjusting said friction elements (13, 20) whereby each presents a zero sliding torque, and by acting on at least two opposite said load-bearing elements (10, 11; 16, 18) by means of an actuator (38) so as to produce a relative movement of said two load-bearing elements.

7. A method as claimed in claim 5 characterized by the fact that said friction elements (13, 20) are so adjusted as to present a maximum sliding torque below the value which, during impact testing, would stress the load-bearing elements (10, 11; 16, 18) over and above their yield point.

8. A reusable model-structure (6) for simulating, during impact testing, the dynamic collapse performance of a vehicle front body assembly; characterized by the fact that it comprises first (8) and second (9) trestle type side members collapsible in an accordion fashion, located parallel to each other, and each comprising a number of arms (16, 18) hinged in series with one another by respective articulating means (19, 20), and a number of hydraulic friction (20) joints constituting at least some of said articulating means.

9. A model-structure (6) as claimed in claim 8, characterized by the fact that each said hydraulic joint (20) is connected by a respective pressure regulating valve (42) to pressurized fluid supply means (43), so that each presents an adjustable sliding torque below which any relative movement of said connected arms (16, 18) is prevented, and above which said arms (16, 18) are permitted to rotate in relation to one another with a predetermined amount of friction and about their respective mutual hinge axes.

* * * * *